Figure 1:
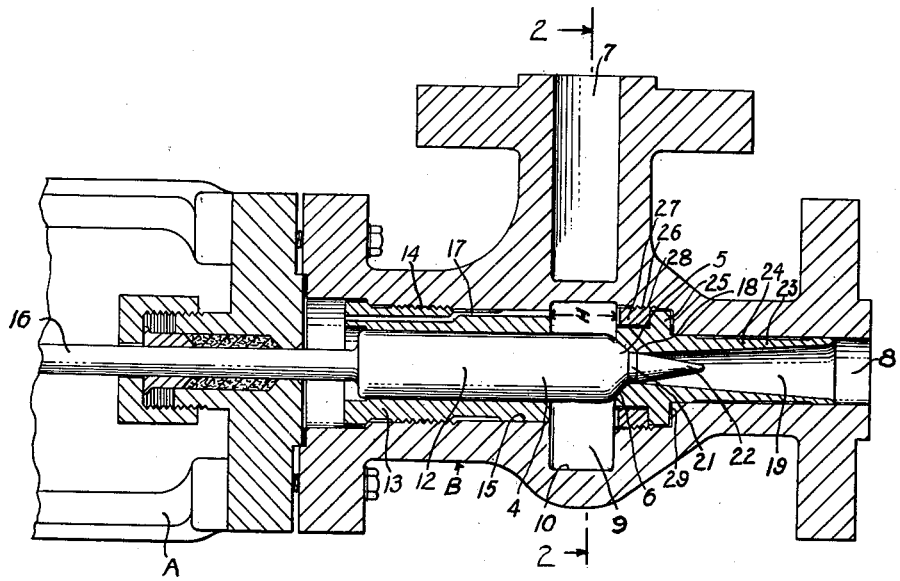

May 27, 1952 R. L. MEYER 2,598,187
VALVE
Filed Oct. 8, 1948

INVENTOR.
ROYAL L. MEYER
BY
ATTORNEYS.

Patented May 27, 1952

2,598,187

UNITED STATES PATENT OFFICE 2,598,187

VALVE

Royal L. Meyer, Willoughby, Ohio, assignor to The Swartwout Company, Cleveland, Ohio, a corporation of Ohio Application October 8, 1948, Serial No. 53,499

4 Claims. (Cl. 251—27)

This invention relates to fluid regulating valves and more particularly to valves adapted to handle liquids, flashing condensate or fluids carrying entrained liquids at a high pressure drop.

Valves which find service in handling liquids or fluids carrying entrained liquid particles at a high pressure drop are subject to severe and destructive erosion resulting from impingement of the liquid upon the exposed surfaces and operating parts of the valves. Under such conditions of use valves of design according to the prior art have had their performance much impaired after only short periods of use and have required frequent repair, maintenance or replacement.

The rapid destruction of prior art valves under such conditions is due to the design of these valves which permits the liquid particles to strike the valve surfaces at relatively high angles of collision, in a great many cases the collisions being at direct angles. The impact of the liquid particles leads, of course, to a high rate of wear. Another factor which is conducive to failure in valves of the prior art is the tendency of the flowing fluid to be channeled into paths of flow over particular areas of the valve stem and valve seat surfaces. The areas which are subjected to this type of concentrated flow tend to erode at a high rate and the result is the formation of highly localized eroded areas which cause the valve to be withdrawn from service while most of the valve surfaces are intact and in useful operating condition. Yet another defect in the design of prior art valves is the failure of the valves to prevent "wire drawing," a condition which exists when the valve is nearly closed, at which time the fluid passing through the small orifice acquires a high velocity and accordingly becomes more erosive.

My invention introduces a number of novel features of design which substantially obviate the above described malfunctions. Thus the inlet passage of the valve is curved to one side to lead the fluid stream in a path which avoids direct impingement upon the valve stem and seat and diverts the flow from direct straight line movement toward the valve stem and valve seat into a curved path such that the angle of incidence or impingement with the valve surfaces is always relatively small, keeping erosion and wear at a minimum. Secondly, the inlet passage immediately adjacent the valve stem, and valve seat is caused to diminish in cross sectional area in the direction of fluid flow progressively and uniformly in a manner which causes the fluid stream to flow radially in substantially equal amounts and with substantially equal velocities over all points of the seat and disc with the result that channelization of fluid flow and the accompanying localized erosion does not occur and with the result such wear that does occur is even and uniform and therefore does not impair the sealing function of the valve. Also my valve guards against the dangers of "wire-drawing" by holding the sealing surfaces of the valve disk and seat widely spaced apart when the valve is nearly closed, utilizing auxiliary means to restrict the flow of fluid through the valve at such times. By this means the seating surfaces of the valves are isolated from the high velocity stream of fluid. With these and other features fluids and liquids under high pressure drops and other conditions which tend to be highly erosive can be advantageously handled by my valves possessing a long service life with a minimum of maintenance and care.

An object of my invention therefore is to provide a valve in which the flow of fluid through the valve is directed so that the direction of fluid flow is at a small contact angle with the contacted surfaces, avoiding direct impingement with the surfaces and resulting in minimum wear and erosion. Another object is to provide a valve having an inlet passage which terminates in a converging chamber surrounding a valve stem, disc and seat such that the fluid flowing past the disc and seat is distributed in substantially equal amounts and with substantially equal velocities at all points. Another object is to provide a valve in which the wall of the chamber surrounding the valve seat and stem traces out an Archimedean spiral which tends to distribute the discharging fluids equally and uniformly over the valve seat and disc. Another object is to provide a valve in which side thrust on the stem and disc is substantially eliminated.

Another object is to provide a valve in which the valve stem is effectively supported against side thrust and deflections. Another object is to provide a valve having an outlet passage having orderly discharge characteristics which provide for discharge of fluids with a minimum of turbulence and noise in operation. Another object is to provide a valve which is easily and economically manufactured, which has a relatively long life, which may be easily maintained, and which can be quickly repaired and restored to operating efficiency.

Other objects and advantages will appear from the following description of my invention, reference being made to the accompanying figures in which: Figure 1 is a longitudinal sectional view in part of a preferred form of my invention, and Figure 2 is a transverse sectional view of the valve of Figure 1 taken along the plane 2—2 of Figure 1.

A preferred form of my invention finds embodiment in a flow regulating valve which is well adapted to handle flashing condensates. Such service entails high pressure drops and subjects the valve to severely erosive conditions. The valve comprises a body B secured to conventional valve operating means A, not entirely shown, see Figure 1. Within the body a cantilever supported and guided valve stem 4 carries a disc 5 which with a valve seat 6 controls the flow of fluid through the valve; the fluid entering the valve through an inlet 7 and leaving through an outlet 8 disposed at right angles to the inlet passage.

The configuration of the inlet passage 7 and particularly that portion leading to and adjacent the valve seat 6 is such as to substantially reduce wear and erosion of the valve surfaces. Thus the inlet passage 7 bends laterally beginning at about point X to direct the fluid stream smoothly and tangentially into a chamber 9 which encircles the stem, the fluid thus being directed in a manner which avoids direct impingement of the fluid stream upon the stem and seat. This initial lateral deflection of the fluid stream away from the stem prevents erosion of the surfaces of the stem which face upstream and prevents any concentrated flow of fluid over the valve seat at or near the same point, i. e. the upstream side of the seat. For reasons which will be more fully described later, I prefer that the inlet passage, which conveniently is of circular cross section at its entrance, change gradually in section as from a round section at point X to substantially rectangular section at about the point Y, continuing its rectangular form throughout the chamber 9, see Figure 1.

Figure 2:
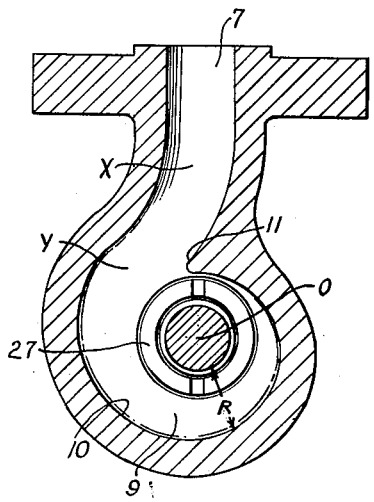

The chamber 9 beginning at about the point Y is bounded by an outer wall 10 which traces out substantaily an Archimedean spiral path converging in a counter-clockwise direction as shown in Figure 2 and having its origin O coincident with the axis of the stem and seat. Since the stem is circular, the variable distance R, indicated in Figure 2 as the radial distance between the stem 4 and the spiral wall 10, is proportional to its angular position. This radial distance R thus decreases in length by equal increments for equal angular distances around the spiral as shown. Since the height H of the chamber 9 is preferably constant through the chamber, see Figure 1, and since the section at every angular position of the chamber 9 is rectangular, the cross-sectional area at every angular position is determined by the value of R. It will be seen therefore that the cross sectional area, or in other words the capacity, of the chamber 9 continuously and uniformly diminishes in the direction of the flow of fluid i. e. in a counter-clockwise direction. The result is that as the stream of fluid flows around the chamber 9, the uniform decrease in capacity causes the fluid to flow uniformly over the seat into the outlet passage, equal amounts of fluid at equal velocities tending to flow over every like circumferential division of the seat. No one point or portion of the seat is required to carry more than its share of fluid "traffic" nor is it subjected to any substantially different kind or character of flow, wear or service than any other portion or part. This equal or substantially equal distribution of burden prevents any concentrated localized erosion or wear of the seat and disc. Such wear as does result is uniform and does not impair the utility of the valve.

As mentioned above I prefer that the chamber 9 be substantially rectangular in section and of constant height. With such dimensions the Archimedean spiral provides the proportional reduction in capacity with angular position which is desired. On the other hand the cross-sectional shape of the chamber 9 may take other forms without departing from this desired characteristic progressive decrease in capacity, but in such case it may be necessary to modify the Archimedean spiral to compensate for the variance in chamber section.

The bend of the inlet passage beginning at about X diverts the fluid stream away from the stem 4, the bend defining at its right side, as viewed in Figure 2, a projection 11 which shields the stem 4, disc 5 and seat 6 from the direct impact of the fluid stream, the stream being led smoothly and tangentially first into the chamber 9 and then around and toward the axis of the stem and over the seat in a spiral-helical course. In shielding the stem from the direct impingement of the fluid stream and causing substantially equal increments of flow to be directed toward the stem, disc, and seat from all directions, the parts are not only protected from erosion but also from side-thrusts, shock and deflections that tend to interfere with their seating and sealing functions.

Preferably the inlet passage 7 up to the point Y is of substantially constant area, but as the stream passes the projection 11 it emerges into a section of greater cross-sectional area, i. e. the dimension "R" is a maximum at about this point. Consequently the fluid stream may and preferably does lose rather than gain velocity as it enters the chamber 9 where it begins its compound spiral and radial movements around the stem and across the seat. This loss in velocity also helps to minimize erosion by the fluid stream as it enters chamber 9 and is a factor in the effective control of the fluid flow.

I also prefer to have the cantilever portion of the stem that is disposed and movable in the chamber 9 relatively short in length and great in diameter; the diameter approximately equalling the height of the chamber. The cantilever portion is consequently stiffer and is better able to withstand bending forces and maintain its true position. Accordingly the height H of the chamber 9 is kept as small as practicable without throttling the flow when the valve is wide open; the varying width R being made great enough at all points to afford the desired capacity in the valve.

The cantilever stem 4 is preferably guided and supported by means of an enlarged portion 12 which has a close sliding fit within a sleeve 13, both the portion 12 and the sleeve 13 being of substantial length in order to give adequate bearing support to the stem and to enable its accurate positioning with regard to the seat. Rigidity of the stem is thus ensured. The sleeve 13 is threadedly secured as at 14 within a bore 15 which is coaxial with and aligned with the outlet passage 8. Preferably the valve stem has a portion 16 of reduced diameter extending beyond the valve body for connection to any suitable operating means, generally designated as A but not fully shown in Figure 1 as such means are old and form no part of my invention. In order that the valve stem may be easily operated the sleeve 13 is provided with a relief passage 17 to balance the pressures on the stem and to permit any fluid which has leaked past the stem to escape when the stem is moved to open position.

The stem and outlet passage 8 beyond the seat 6 are such as to prevent wire drawing with its deleterious effects on the stem and seat and to discharge the fluid without turbulence, eddy current formation or vibration. The discharging fluid passes through, in order, the seat 6, a relatively short cylindrical throat 18 and a conical discharge portion 19 flaring outwardly from the throat at an angle which provides for proper expansion of the discharging fluid. The valve stem terminates in a portion adapted to cooperate with the seat and discharge passage and comprises a conical tapered disc portion 5 adapted to contact the seat 6 in sealing engagement and a short cylindrical portion 21 corresponding in dimensions to the throat 18 and adapted to fit closely and slidably therein. The stem finally terminates in a pointed pilot tip portion 22.

"Wire drawing" is minimized if not completely obviated by the described features of design. When the valve is first cracked with the disc 5 and seat 6 spaced apart, the stem part 21 still throttles the throat 18 so that only a very small volume of fluid can be discharged. Later, in the opening movement when the part 21 has been completely withdrawn from the throat, the disc 5 and the seat 6 are too widely spaced for wire drawing to occur. In a similar manner wire-drawing can not occur when the valve is moved to closed position. The part 21 will first enter the throat 18 and substantially cut off the flow of fluid while the disc 5 is separated from the seat 6 far enough to keep the fluid velocities low. Thereafter the flow of fluid is so small that the disc 5 can be seated without wire-drawing and without erosion. The sealing surfaces of the seat 6 and disc 5 are thus preserved.

I prefer that the seat 6, throat 18, and the discharge passage 19 be incorporated in a unitary valve seat insert member 23 which like the stem is preferably made from corrosion and wear resistant material such as stainless steel or similar material. As shown in Figure 1, the insert 23 has a cylindrical body portion 24 adapted to be press-fitted within the outlet passage 8, and is provided with a flange 25 integral with the body portion 24 and adapted to seat within a counterbore 26 of the outlet passage. The flange is secured within the counterbore by an annular compression nut 27 which is threadedly inserted within the counterbore as at 28 and which is adapted to hold the flange tightly against the bottom of the counterbore. A gasket 29 interposed between the flange and the bottom of the counterbore and compressed therebetween prevents leakage at this point.

The bore 15 gives access to the interior of the valve body for easy and convenient assembly and for replacement and repair of any faultily performing part. To fully assemble the valve, the gasket 29 is placed within the counterbore 26, the insert 23 is placed in position and the compression nut 27 is drawn down to hold the insert tightly in place, the nut being turned by a wrench extending through the bore 15 and having appropriate lugs to engage recesses 30 of the nut. The sleeve 13 is threaded in place and the stem 4 is inserted. The assembled valve can then be secured to the means A by conventional means known to the art.

While I have described a preferred form of my invention, various modifications and changes will occur to those skilled in the art without departing from the spirit of my invention and from the teaching herein and I do not care to be limited in any manner other than by the claims appended hereto.

I claim:

1. A valve comprising a valve seat, an inlet passage terminating in a chamber adjacent to and surrounding said valve seat and a discharge passage leading from the valve seat, a valve stem extending into said chamber cooperating with said valve seat to control the flow of fluid through said valve, a baffle projecting into said inlet passage diverting fluid to one side away from said stem and seat into said chamber, the cross-sectional area of said chamber diminishing at a substantially uniform and constant rate as it follows around said stem and seat whereby substantially equal amounts of fluid tend to pass over said seat at all circumferential points thereof, said seat and said discharge passage comprising a conical portion of relatively short length converging to a cylindrical throat and a conically diverging discharge nozzle type passage leading from said throat, said stem having a cylindrical portion of large diameter closely fitting in and supported by a corresponding bearing surface, said stem having a pilot portion comprising a cylindrical section adapted to fit within said valve throat and terminating in a conical pointed extreme end part, said large cylindrical portion and said pilot portion being joined by a conical shoulder adapted to seat within and contact said converging valve seat portion when said valve is closed.

2. A valve for handling fluids at a high pressure drop comprising a body having an inlet passage terminating in a chamber and an outlet passage disposed at right angles thereto an insert comprising a sleeve of corrosion resistant material removably secured in said body adjacent the juncture of said chamber and outlet passage and coaxial with said outlet passage, said sleeve having a conical seat, a cantilever supported valve stem disposed in said body in alignment with said insert and having a disc portion adapted to cooperate with said seat to control the flow of fluid through said valve, said inlet passage terminating in said chamber surrounding said disc and seat and converging in cross-sectional area in the direction of fluid flow uniformly with respect to the angular position around said seat whereby said fluid is caused to flow uniformly in substantially equal amounts and with substantially equal velocities over every circumferential portion of the seat and disc; said chamber forming a smooth continuation of said inlet passage and having flat upper and lower walls parallel with the axis of said inlet passage.

3. In a flow regulating valve having a body with a cored inlet passage in one plane and a transversely disposed outlet opening and an axially movable stem disposed coaxially of said outlet opening, the improvement that the outlet opening comprise a bore and counter-bore on the outlet side of said intake passage, an externally shouldered wear resistant insert seated in said bore and counter-bore and having a valve seat portion adjacent said intake passage and a flow portion defining an outlet passage leading away from said seat, a second bore and counter-bore coaxial of said outlet bore and disposed on the opposite side of said intake passage and of at least as great diameter as said first named counter-bore, a stem supporting bushing secured in said second named bore having an external shoulder bottoming in said second named counterbore remote from said intake passage, the ends of said insert and bushing adjacent said intake passage lying flush with the proximate surfaces of said intake passage, said stem having a diameter in said intake passage approximately equal to the spacing between the proximate ends of said bushing and insert and having a closure disc portion coacting with the seat of said insert.

4. A valve for handling mixtures of liquid and gaseous fluids at a high pressure drop comprising a body having a spiral chamber with parallel flat top and bottom walls, an outlet passage leading from said chamber at right angles to the bottom wall thereof, a valve seat at the juncture of said outlet passage and said bottom wall, a valve stem coaxially aligned with said outlet passage traversing the top wall of said chamber and having a closure disc portion coacting with said seat, an inlet passage parallel to said top and bottom walls entering said chamber tangentially of said stem, and a baffle at the juncture of said inlet passage and said chamber diverting entering fluid from said stem, said chamber having a maximum cross-sectional area at least equalling the maximum cross-sectional area of said inlet passage and uniformly decreasing in cross-sectional area from said inlet passage around the axis of said stem to said baffle whereby substantially equal amounts of fluid tend to pass over said seat at all circumferential parts thereof.

ROYAL L. MEYER.

REFERENCES CITED

The following references are of record in the file of this patent:

UNITED STATES PATENTS

| Number | Name | Date |
| --- | --- | --- |
| 1,916,738 | Miller | July 4, 1933 |

FOREIGN PATENTS

| Number | Country | Date |
| --- | --- | --- |
| 337,118 | Germany | of 1921 |
| 384,422 | Great Britain | of 1932 |